2,861,016

ELECTROLYTE LIQUID FOR STORAGE BATTERIES

James F. Macholl, Milwaukee, Wis., assignor to Gould-National Batteries, Inc., St. Paul, Minn.

No Drawing. Application June 4, 1956
Serial No. 588,950

1 Claim. (Cl. 136—154)

This invention relates generally to lead acid storage batteries and more particularly to the electrolytes used therein. This application is a continuation-in-part of my application Serial No. 377,731, filed August 31, 1953, now abandoned.

The primary object of the invention is to provide an improved electrolyte for a lead acid storage battery which will prolong the life of such battery, particularly when subjected to overcharge conditions.

Another object of the invention is to provide a battery preservative in the form of an additive which might be introduced into the battery either during production or after the battery has been in use.

Still another object of the invention is to provide an improved electrolyte for a storage battery adapted to preserve and prolong the life of wood or other cellulose type separators used in the battery.

Still another object of the invention is to provide an improved electrolyte for storage batteries which allows reduction of the battery lead content below normal weight without affecting the life expectancy of the battery.

Still another object of the invention is to provide a novel means and method for prolonging the grid life of storage batteries which is relatively simple and inexpensive to carry out.

With these and other more detailed and specific objects in view my invention broadly comprises the addition of silver sulphate to the battery electrolyte in limited amounts as hereinafter described.

As is well known in the lead acid storage battery industry, the positive grid of the battery is subject to deterioration during its life, through oxidation of the metallic grid lead to lead peroxide. Such deterioration is especially occurrent when the battery is in over-charge service. The rate of deterioration of the positive grid is further increased by the fact that the antimony, commonly alloyed with the lead, in the grid has a natural tendency to leach out or dissolve and deposit on the surface of the sponge lead of the negative plate, thus setting up an internal couple on the negative plate. This causes a rapid self-discharge of the battery as its age increases. Furthermore, the voids left in the positive grid by its loss of antimony enhances the corrosion of the grid by presenting porous cavities and additional surfaces to the electrolyte.

By my improved electrolyte I have been able to retard the rate at which the antimony leaves the positive grid and thereby present a sounder grid during the life of the battery. This is accomplished through dissolving silver sulphate into the sulphuric acid electrolyte solution, commonly used in such batteries, either before or after the solution is placed in the battery cell.

The improved electrolyte solution and its means of manufacture will now be disclosed in greater detail. I have found that the most economical, yet beneficial percentage of the silver sulphate additive to use lies in the range furnishing to the electrolyte solution between .02 to 2.0 grams of silver per liter of solution. The sulphuric acid solution so used may have a strength or gravity of 1.200 to 1.300 in the fully charged battery.

Inasmuch as the metal silver itself will not be readily dissolved in the sulphuric acid it is introduced in the form of silver sulphate ($Ag_2SO_4$). Correction is made for the additional weight of the sulphate radical in determining the correct amount of silver sulphate additive to be used to obtain the desired percent of metallic silver in the solution.

The silver sulphate may be added to each cell of the battery after it has been filled with the sulphuric acid solution and will dissolve therein as the battery is used. However, the addition may also be made to bulk sulphuric acid and the solution then put into the battery in the normal manner.

It have found that the silver sulphate so added to the battery will form a protective coating or like phenomena over the positive grid so as to retard the rate at which the antimony leaves the grid. With the positive grid so preserved the service life of the battery is extended considerably.

S. A. E. overcharge tests were performed on a number of standard 80 ampere hour, thirteen plate batteries half of which had sufficient silver sulphate added to furnish 75 grams of silver to 1 liter of the electrolyte, the other half using a standard electrolyte without the additive. The two groups were tested at weekly periods for minutes discharge at 300 amperes at 100° F. with the following results. The untreated batteries will be referred to as "Group A" and the treated as "Group B." At two weeks both groups showed six minutes discharge. At four weeks Group A showed approximately five and one-half minutes, while Group B showed slightly over six minutes. At five weeks Group A discharged four minutes, Group B still six minutes. At the end of the sixth week Group A showed two minutes, with Group B just under six minutes. At seven weeks Group A was down to one-half minute, while Group B continued to show over five and one-half minutes. While Group A failed completely shortly after the seventh week, Group B with the additive, showed one and one-half minutes discharge after ten weeks. The initial capacity of the treated batteries showed higher and the capacity of the untreated batteries never surpassed that of the treated batteries throughout the period of the test.

In other tests the silver sulphate additive was found to increase the overcharge life of the fifteen plate, 100 ampere hour battery from approximately eight weeks to approximately fifteen weeks.

The effect, of the addition of silver sulphate to the electrolyte, upon the separators used in the battery is also believed to be of considerable importance. Wood or other fibrous separators are in common use today. In normal battery life these separators deteriorate and lose their effectiveness through corrosive action of the electrolyte.

In the aforementioned tests conducted both the 80 and the 100 ampere hour batteries contained fir separators. After both tests an examination of the batteries containing the silver sulphate additive indicated an unusually good fiber condition of the separators. The separators had a light colored appearance similar to their original condition as contrasted to the dark charred condition of the separators in the untreated batteries. It accordingly appeared from these tests that the silver sulphate added to the electrolyte has a very definite preservative effect on wood separators. Several of the batteries used in the tests contained plastic, glass floss, or glass separators none of which were harmfully affected by the additive.

While a silver content of .75 gram silver per liter of electrolyte used in the aforementioned tests it has been found through experiment that battery life is increased according to the amount of the additive used. However, as the additive is increased the battery life is increased at a diminishing rate. Accordingly, while additions of up to 5 grams of silver per liter may be used with increasing effectiveness, it is thought that the most efficient quantity of silver while yet giving the benefits desired would lie in the range of .5 gram to 2.0 grams; although effective results may be obtained through use of only .02 gram silver per liter. In brief, it is found that the addition of silver over and above the 2 grams per liter is not economically desirable as the cost of the added amount outweighs the benefits received from the same.

It is understood that suitable modifications may be made in the structure as disclosed, provided such modifications come within the spirit and scope of the appended claim. Having now therefore fully illustrated and described my invention, what I claim to be new and desire to protect by Letters Patent is:

In a lead acid storage battery having a positive grid and a negative plate separated by means of a cellulose fibre type separator exposed to a common liquid electrolyte, said electrolyte comprising essentially a water solution of sulphuric acid without substantial impurities, having also silver sulphate dissolved therein, said solution having a specific gravity of at least 1.20.

References Cited in the file of this patent

UNITED STATES PATENTS

| | | |
|---|---|---|
| 1,719,204 | Tefft | July 2, 1929 |
| 2,649,766 | Johnson | Aug. 25, 1953 |